US011700802B2

(12) United States Patent
Anderson et al.

(10) Patent No.: US 11,700,802 B2
(45) Date of Patent: Jul. 18, 2023

(54) SYSTEM, METHOD AND APPARATUS FOR IRRIGATION CONTROL AND DATA MANAGEMENT

(71) Applicant: Valmont Industries, Inc., Omaha, NE (US)

(72) Inventors: Ashley E. Anderson, Elkhorn, NE (US); Christopher M. Anderson, Oakland, IA (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 17/836,043

(22) Filed: Jun. 9, 2022

(65) Prior Publication Data
US 2022/0295715 A1    Sep. 22, 2022

Related U.S. Application Data

(63) Continuation of application No. 17/225,325, filed on Apr. 8, 2021, now Pat. No. 11,382,286.

(60) Provisional application No. 63/021,175, filed on May 7, 2020.

(51) Int. Cl.
    *A01G 25/16*    (2006.01)
(52) U.S. Cl.
    CPC .................. *A01G 25/167* (2013.01)
(58) Field of Classification Search
    CPC .... A01G 25/167; A01G 25/16; A01G 25/092; A01G 25/09
    See application file for complete search history.

(56) References Cited

U.S. PATENT DOCUMENTS

| 4,567,563 A | * | 1/1986 | Hirsch | A01G 25/16 40/608 |
| 5,927,603 A | * | 7/1999 | McNabb | A01G 25/167 239/69 |
| 7,050,887 B2 | * | 5/2006 | Alvarez | G01D 21/00 239/69 |
| 8,219,254 B2 | * | 7/2012 | O'Connor | G05D 7/0664 405/38 |
| 8,615,329 B2 | * | 12/2013 | O'Connor | G05D 7/0664 700/285 |

(Continued)

FOREIGN PATENT DOCUMENTS

WO    2019224817 A1    11/2019

OTHER PUBLICATIONS

International Appl. No. PCT/US2021/026335, International Search Report and Written Opinion dated Jul. 20, 2021, 10 pages.

*Primary Examiner* — David Colon-Morales
(74) *Attorney, Agent, or Firm* — Milligan PC LLO

(57) ABSTRACT

The present invention provides a system, method and apparatus for irrigation control and data management. According to a preferred embodiment, an irrigation control system may include a data collection module which receives and stores system data generated by sensors and supporting systems including irrigation, drive, weather, sensor and electrical systems of a mechanized irrigation system. According to preferred embodiments, the system preferably also includes a system control module which transmits system control instructions to system components. Additionally, the present invention also includes a display module which provides a display of graphical user interfaces embedded with system data and selectable control instructions.

17 Claims, 14 Drawing Sheets

(56) References Cited

U.S. PATENT DOCUMENTS

| | | | | |
|---|---|---|---|---|
| 8,649,907 | B2* | 2/2014 | Ersavas | H04L 67/10 |
| | | | | 700/275 |
| 9,043,036 | B2* | 5/2015 | Fekete | G05B 15/02 |
| | | | | 700/282 |
| 9,241,451 | B2 | 1/2016 | Ersavas et al. | |
| 9,886,016 | B2* | 2/2018 | Bermudez Rodriguez | |
| | | | | G05B 15/02 |
| 10,015,938 | B1* | 7/2018 | Malsam | C05G 3/50 |
| 10,474,975 | B1* | 11/2019 | France | G01F 23/296 |
| 10,531,616 | B2* | 1/2020 | Thatcher | A01G 25/162 |
| 10,999,982 | B2* | 5/2021 | Larue | A01G 25/167 |
| 11,071,262 | B2* | 7/2021 | Fischman | A01G 25/092 |
| 11,234,381 | B1* | 2/2022 | Mikkelson | A01G 25/167 |
| 11,382,286 | B2* | 7/2022 | Anderson | A01G 25/167 |
| 2007/0260400 | A1* | 11/2007 | Morag | G06Q 10/00 |
| | | | | 702/189 |
| 2010/0032493 | A1* | 2/2010 | Abts | A01G 25/092 |
| | | | | 239/11 |
| 2014/0236868 | A1* | 8/2014 | Cook | A01G 25/16 |
| | | | | 705/412 |
| 2019/0297799 | A1* | 10/2019 | LaRue | A01G 25/167 |
| 2020/0163292 | A1* | 5/2020 | Gerdes | A01G 25/09 |
| 2020/0383283 | A1* | 12/2020 | Thatcher | H04W 4/021 |
| 2021/0169023 | A1* | 6/2021 | Haran | G01S 13/885 |
| 2021/0176930 | A1* | 6/2021 | Stromp | A01G 25/16 |
| 2021/0345566 | A1 | 11/2021 | Anderson et al. | |
| 2022/0030783 | A1* | 2/2022 | Moeller | G05D 7/0676 |

\* cited by examiner

SYSTEM, METHOD AND APPARATUS FOR IRRIGATION CONTROL AND DATA MANAGEMENT

RELATED APPLICATIONS

The present application claims priority to U.S. Provisional Application No. 63/021,175 filed May 7, 2020.

BACKGROUND AND FIELD OF THE PRESENT INVENTION

Field of the Present Invention

The present invention relates generally to an irrigation data management system. More particularly, the present invention relates to a system, method and apparatus for collecting, processing and displaying system data and control instructions within a mechanized irrigation system.

Background of the Invention

Modern field irrigation machines are combinations of drive systems and sprinkler systems which often include overhead sprinkler irrigation system consisting of several segments of pipe (usually galvanized steel or aluminum) joined together and supported by trusses, mounted on wheeled towers with sprinklers positioned along its length. During irrigation, irrigation machines process and create large sets of data regarding the operation of nozzles, sensors, drives and other components. Additionally, multiple irrigation machines are often used together, and multiple streams of command, sensor and control data are created.

At present, the collection, processing and analysis of data produced by irrigation machines and their supporting components (i.e. pumps, field sensors and the like) largely remains ad hoc and unintegrated. For this reason, the data and the command/control coordination potential for modern irrigation systems remains underutilized.

In order to overcome the limitations of the prior art, a system is needed which can effectively collect, process, analyze and integrate the large amounts of data consumed and produced by modern irrigation machines. Further, a system is needed which allows centralized command and control of each irrigation machine and its supporting components distributed across multiple irrigation locations.

SUMMARY OF THE DISCLOSURE

To minimize the limitations found in the prior art, and to minimize other limitations that will be apparent upon the reading of the specifications, the present invention provides a system, method and apparatus for collecting, processing and displaying system data and control instructions within a mechanized irrigation system.

According to a preferred embodiment, the present invention preferably includes an irrigation control system and a data collection module. According to a further embodiment, the data collection module preferably receives and stores system data from sensors and control systems including: moisture sensors, watering systems, drive systems, weather sensors, and electrical systems.

According to further preferred embodiments, the system of the present invention preferably includes a system control module which transmits system control instructions to system components. According to further preferred embodiments, the present system preferably further includes a display module which provides a display of graphical user interfaces displaying system data and providing selectable control instructions.

DESCRIPTION OF THE PREFERRED EMBODIMENTS

Figure 1:
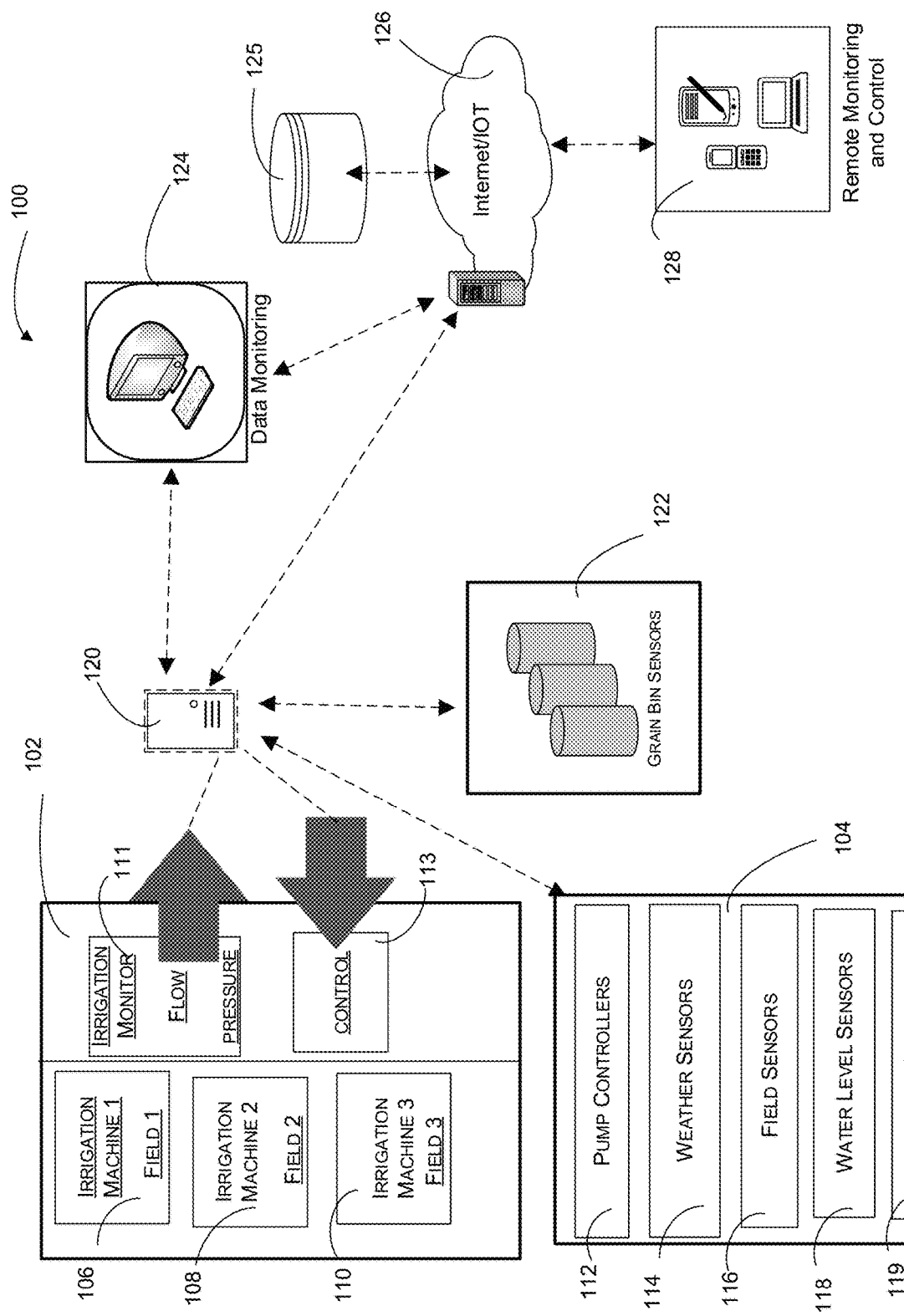
FIG. 1 shows an exemplary irrigation system in accordance with a first preferred embodiment of the present invention.

Reference is now made in detail to the exemplary embodiments of the present invention, examples of which are illustrated in the accompanying drawings. Wherever possible, the same reference numbers will be used throughout the drawings to refer to the same or like parts. The descriptions, embodiments and figures are not to be taken as limiting the scope of the claims. It should also be understood that throughout this disclosure, unless logically required to be otherwise, where a process or method is shown or described, the steps of the method may be performed in any order, repetitively, iteratively, or simultaneously. As used throughout this application, the word "may" is used in a permissive sense (i.e., meaning "having the potential to'), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. A data storage means, as defined herein, includes many different types of computer readable media that allow a computer to read data therefrom including volatile storage such a RAM, buffers, cache memory, and signals within network circuits.

Aspects of the systems and methods described herein may be implemented as functionality programmed into any of a variety of circuitry, including programmable logic devices (PLDs), microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Additionally, the functions of the disclosed embodiments may be implemented on one computer or shared/distributed among two or more computers in or across a network or a cloud.

Communications between computers implementing embodiments may be accomplished using any electronic, optical, radio frequency signals, or other suitable methods and tools of communication in compliance with known network protocols. For example, the present invention may include an RF module for receiving and transmitting electromagnetic waves, implementing the conversion between electromagnetic waves and electronic signals, and communicating with the communication network or other devices. The RF module may include a variety of existing circuit elements, which perform functions, such as antennas, RF transceivers, digital signal processors, encryption/decryption chips, the subscriber identity module (SIM) card, memory, etc. The RF module can communicate with a variety of networks such as the Internet, intranets, wireless network and communicate to other devices via wireless network.

FIG. 1 illustrates an exemplary configuration of components/elements of an irrigation system which may be used with example implementations of the present invention. As should be understood, the irrigation system shown in FIG. 1 is just one exemplary system onto which the features of the present invention may be integrated. Accordingly, FIG. 1 is intended to be purely illustrative and any of a variety of systems, with any of a variety of mixed components and elements may be used without limitation.

With reference now to FIG. 1, an exemplary irrigation system 100 may preferably include a system of data inputs 102 including data inputs from sensors and systems linked to multiple, independent irrigation machines 106, 108, 110. The independent irrigation machines 106, 108, 110 may each include an individual irrigation control system 113 including inputs/outputs to control and monitor the operations of the individual irrigation machine operations, location and status. These inputs/outputs may preferably include active monitors of all system sensors 111 including: irrigation system positions, angular off-sets between irrigation spans, rates of travel, position and alignment of irrigation spans, water flow rates, pressure readings, end gun angles, nozzle duty cycles and the like. Additionally, the control systems 113 of each irrigation machine 106, 108, 110 preferably may receive local and remote signals which may link to local machine controllers to control one or more aspects of the operation of each respective irrigation machine 106, 108, 110. Sets of irrigation machines may be deployed in adjacent areas of a given field or may be remote from one another.

As further shown, the exemplary irrigation system 100 may preferably include links to a variety of field and system components 104 which are independent from the exemplary irrigation machines 106, 108, 110. According to a preferred embodiment, these systems 104 may for example include data and control signals to and from: pump controller(s) 112, weather sensor(s) 114, in-situ field sensors 116 (e.g. moisture sensors), pump control water level sensors 118, and remote field sensors 119 (e.g. satellite, UAV and other aerial sensors). According to further preferred embodiments, the exemplary irrigation system 100 of the present invention may include additional links to deployed grain bin sensors 122 and the like as discussed further below.

As shown in FIG. 1, each of the monitoring and control systems of the present invention preferably may communicate with any of a variety of other remote monitoring and control systems. According to a preferred embodiment, all system data may be integrated within a hosting server 120 which preferably links and assembles data for accessing by individual users. As shown, these may include for example, remote computer monitoring 124 which may be monitored and controlled by an operator or management service. Additionally, the remote monitoring and control systems may include management devices and platforms 128 such as laptop computer, PDAs, smartphones and tablets. These devices 124, 128 may directly interface with the hosting server 120 and/or directly exchange data with the individual data inputs 102 and field/systems 104, 122 via a wireless connection/modem (either directly or via hosted internet service 126 or the like. Additionally, all of the data gathered from the system 100 may be stored and access from one or more other systems/databases 125.

With reference now to FIGS. 2-14, exemplary interactive displays are provided to illustrate the operations of various modules of the present invention and display formats (e.g. web pages) to structure data for monitoring and control purposes. According to preferred embodiments, collected data and control inputs may preferably be extracted, linked and displayed incorporating a number of graphic user interfaces (GUIs) to allow operators to graphically receive system status data. Additionally, the GUIs of the present invention preferably allow operators to see and select control inputs to control the operations of one or more subsystems of the present invention.

Figure 2:
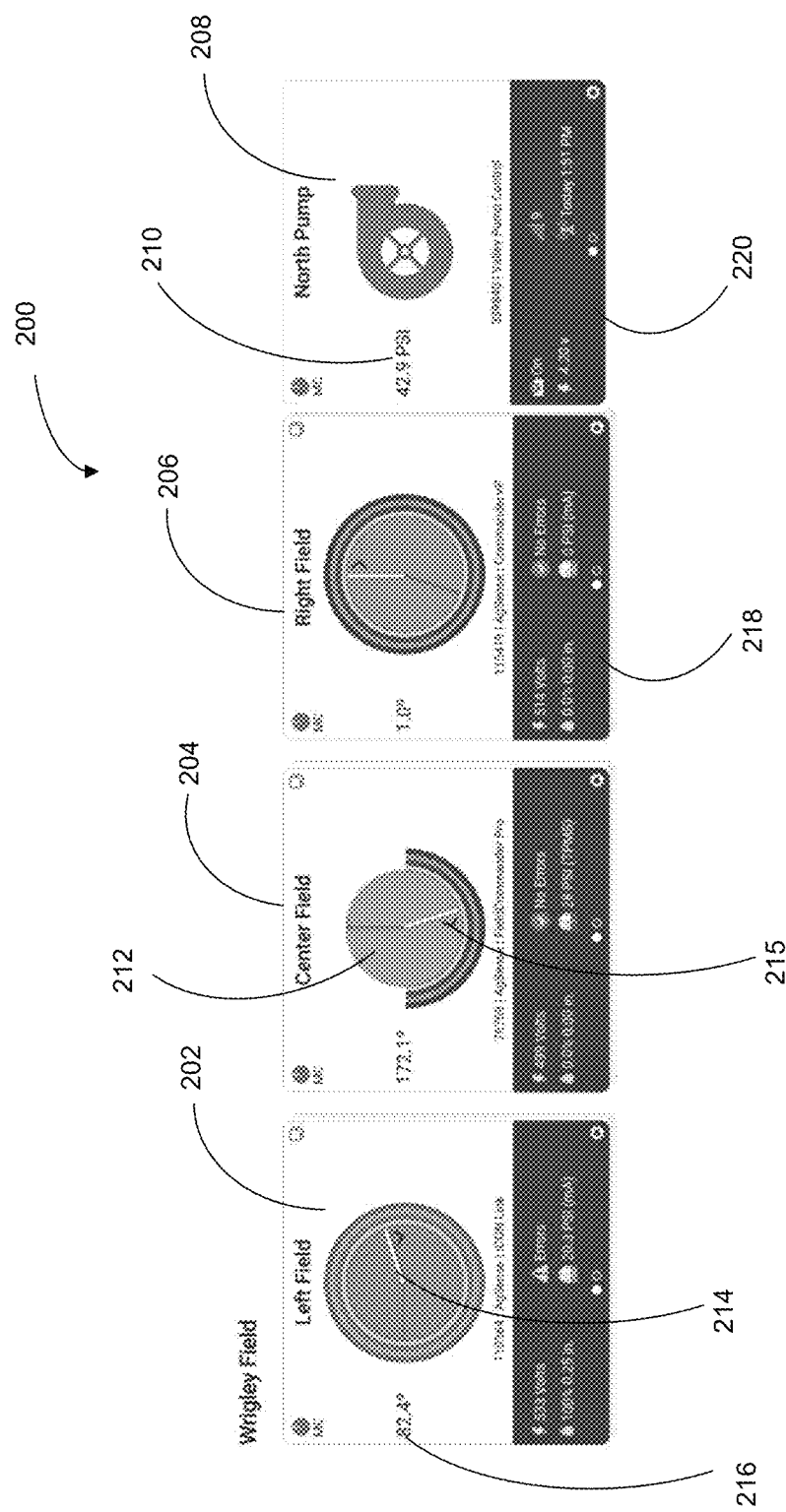
FIG. 2 shows an exemplary interactive display which consolidates a first set of field information in accordance with aspects of the present invention.

Referring now FIG. 2, a first exemplary interactive display 200 is shown which consolidates a first set of field information. As shown, the first exemplary interactive display 200 includes a set of displays 202-206 represented data for a series of adjacent machines within a larger field area.

As shown, the exemplary displays 202-206 provide visual representations of the status of each irrigation machine including the main pivot and corner arm positions 214 and direction 215. The corner arm angle positions may be numerically displayed 216 as well. For each pivot, the display 202-206 may preferably further include visual indicators 218 displaying monitored data for each irrigation machine including data such as: voltage levels, energy consumption rates, system errors, and irrigation levels (e.g. irrigation depths in inches) along an indication of the percentage of field capacity remaining. Within the same display 200, the system of the present invention may preferably also display the status of any monitored field systems such as the status of one or more pumps 208. As shown, the pump status 208 may include an indication of the system pressure 210 as well as other system status indicators 220 such as voltage levels, energy consumption rates, on/off status, the strength of communication signals and the like.

Figure 3:
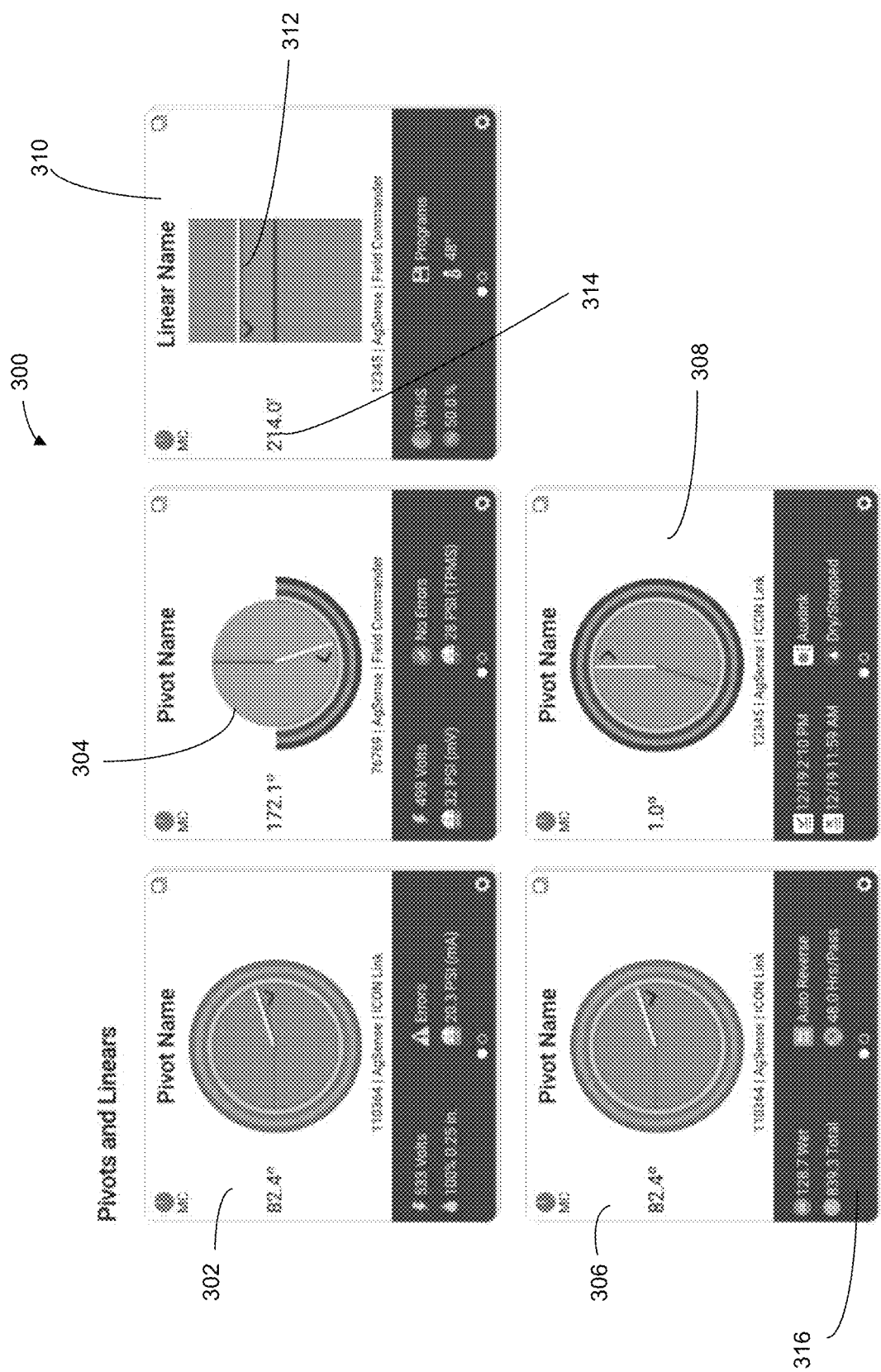
FIG. 3 shows an exemplary interactive display which consolidates a second set of field information in accordance with aspects of the present invention.

With reference now to FIG. 3, a second exemplary interactive display 300 is shown which includes a different combination of monitored field assets. As shown, the displayed assets include displays of a set of center pivot irrigation machines 302-308 as well as a display of a linear pivot machine 310. As shown, the display of the linear pivot machine 310 preferably may include a graphic indication 312 of the progress of a linear irrigation machine across a given field, along with a numerical display 314 of the same. The asset displays 302-310 may also include additional displays of numerical data 316 such as: field percentages/lengths/areas irrigated and not irrigated, irrigation programs selected; time elapsed in current programs, time until next program, readings from multiple pressure sensors and the like.

Figure 4:
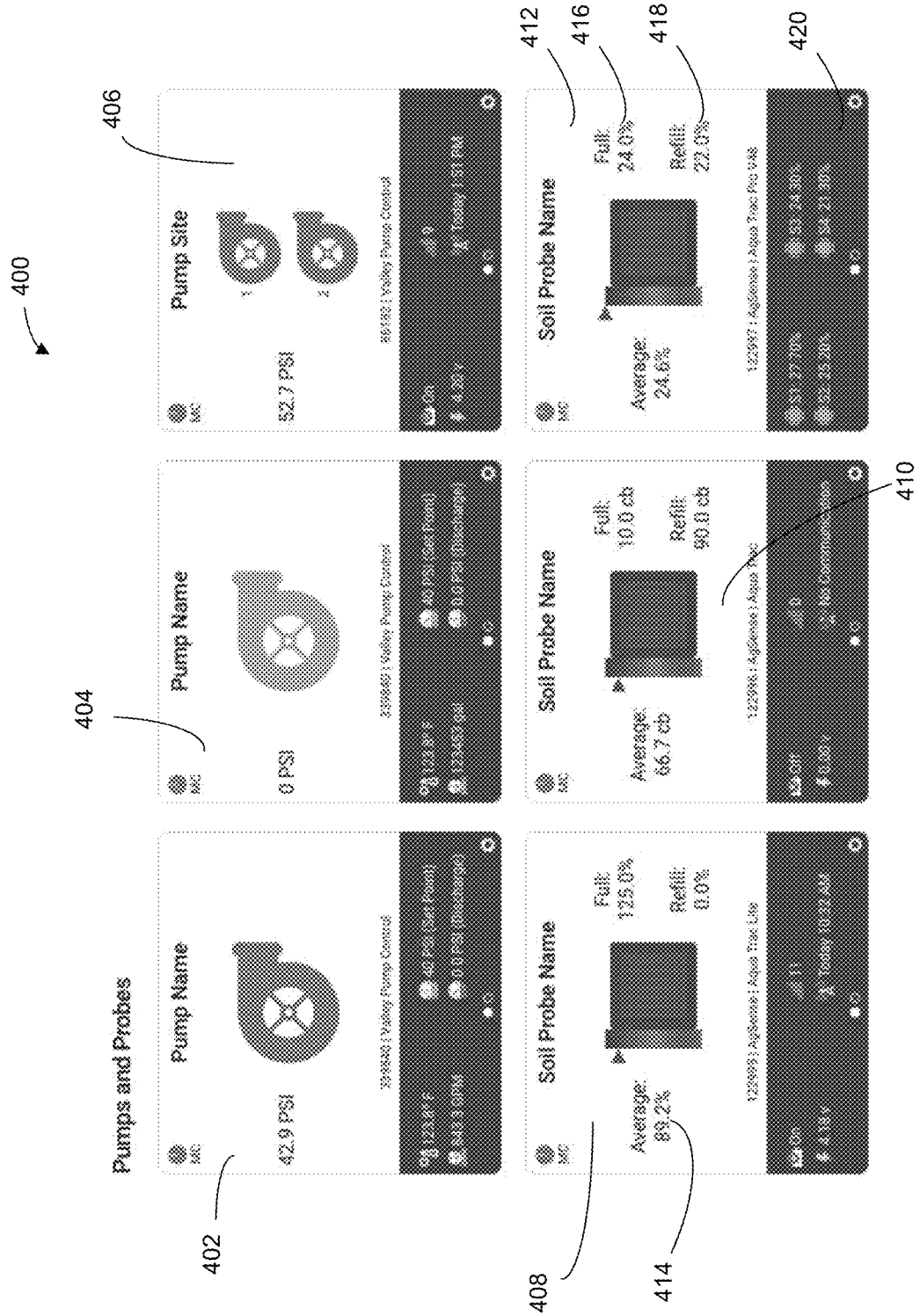
FIG. 4 shows an exemplary interactive display which consolidates a third set of field information in accordance with aspects of the present invention.

FIG. 4 provides a third example interactive display 400 which includes displays of selected monitored pumps 402, 404, 406 and soil moisture probes 408, 410, 412. As shown, multiple pumps 406 at a given site may be displayed together. For the soil moisture probes, each GUI/display may display additional data such as: the actual and average moisture levels 414 over a period of time, field saturation and refill levels 416, 418 (either as a percentage or the actual pressure readings), and other data 420 such as voltage levels and multiple probe readings (such as where more than one soil probe is used for the moisture reading).

Figure 5:
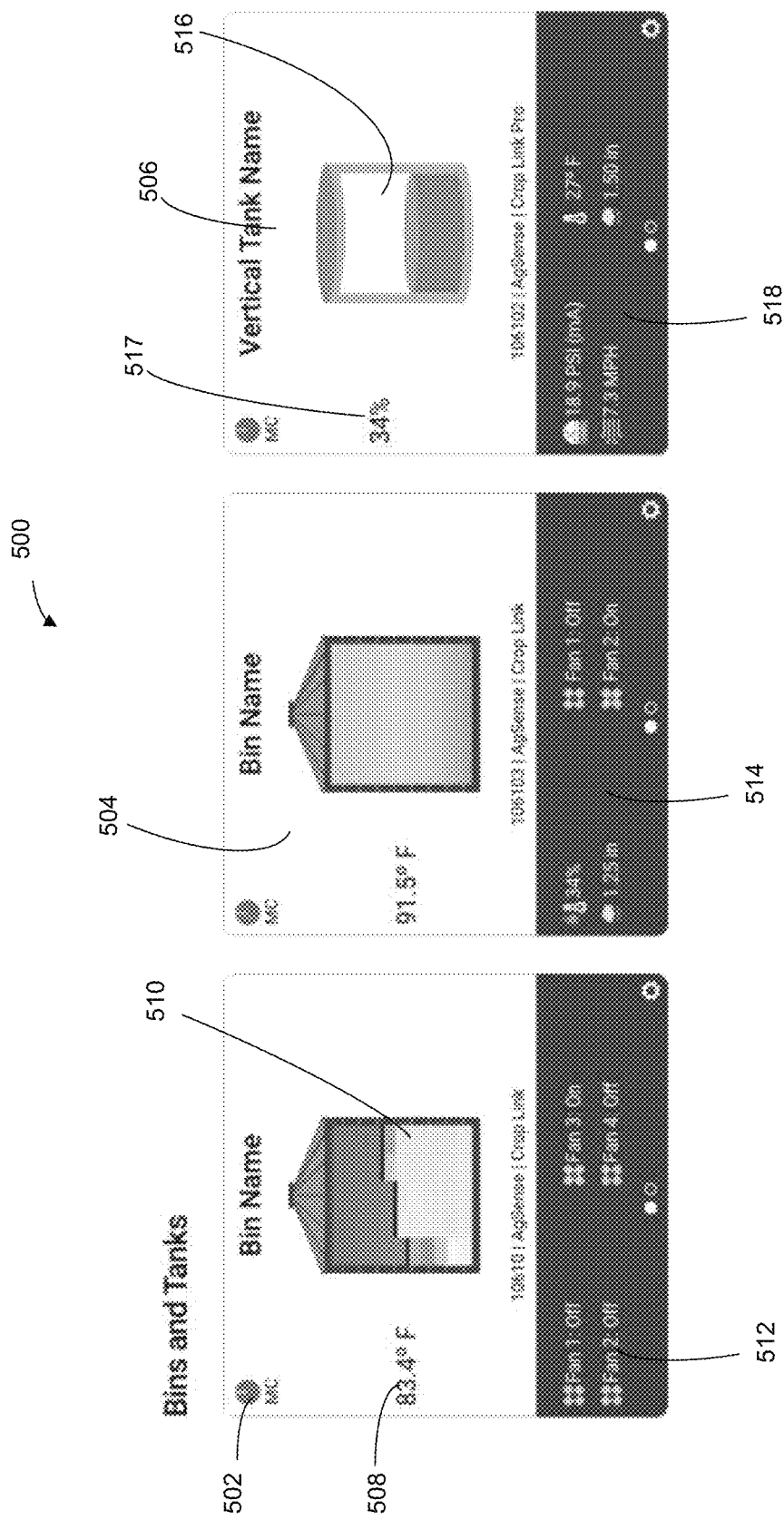
FIG. 5 shows an exemplary interactive display which consolidates a fourth set of field information in accordance with aspects of the present invention.

FIG. 5 provides a fourth example interactive display 500 which includes displays of selected storage/grain bins 502, 504 and an exemplary generic vertical tank 506 shown as a water tank. As shown, each grain bin display 502, 504 may include a graphic display of internal temperatures 508, grain storage levels 510 and the like. Additionally, the grain storage displays may include additional status data 512, 514 such as: the ON/OFF status of fans, internal and external humidity/temperature, measured precipitation and the like. Other vertical tanks displays 506 may include a graphic/GUI 516 indicating the percent filled, numerical displays of the amount filled 517, and additional data 518 such as: internal pressure, temperature, wind measurements and precipitation levels.

Figure 6:
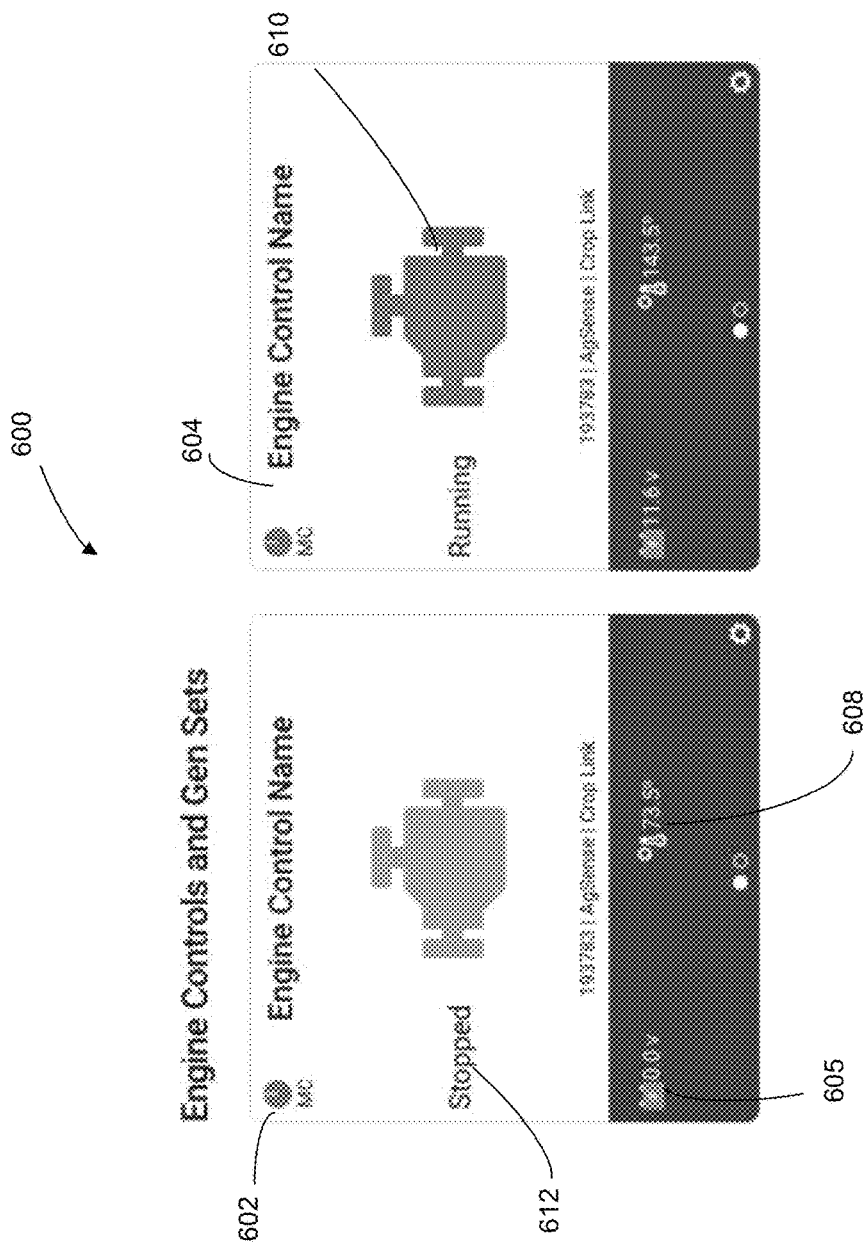
FIG. 6 shows an exemplary interactive display which consolidates a fifth set of field information in accordance with aspects of the present invention.

With reference now to FIG. 6, an exemplary interactive display 600 is shown which consolidates a fifth set of field information is provided. As shown, the exemplary interactive display 600 includes displays 602, 604 of engine data (both for drive engines and generators). As shown, each monitored engine display 602, 604 may include icons/GUIs 610 indicating the engine state (i.e. running or stopped) along with an alphanumeric display of the same. Additional engine data may also be displayed such as: energy consumed, voltage levels 605 and engine temperatures 608.

Figure 7:
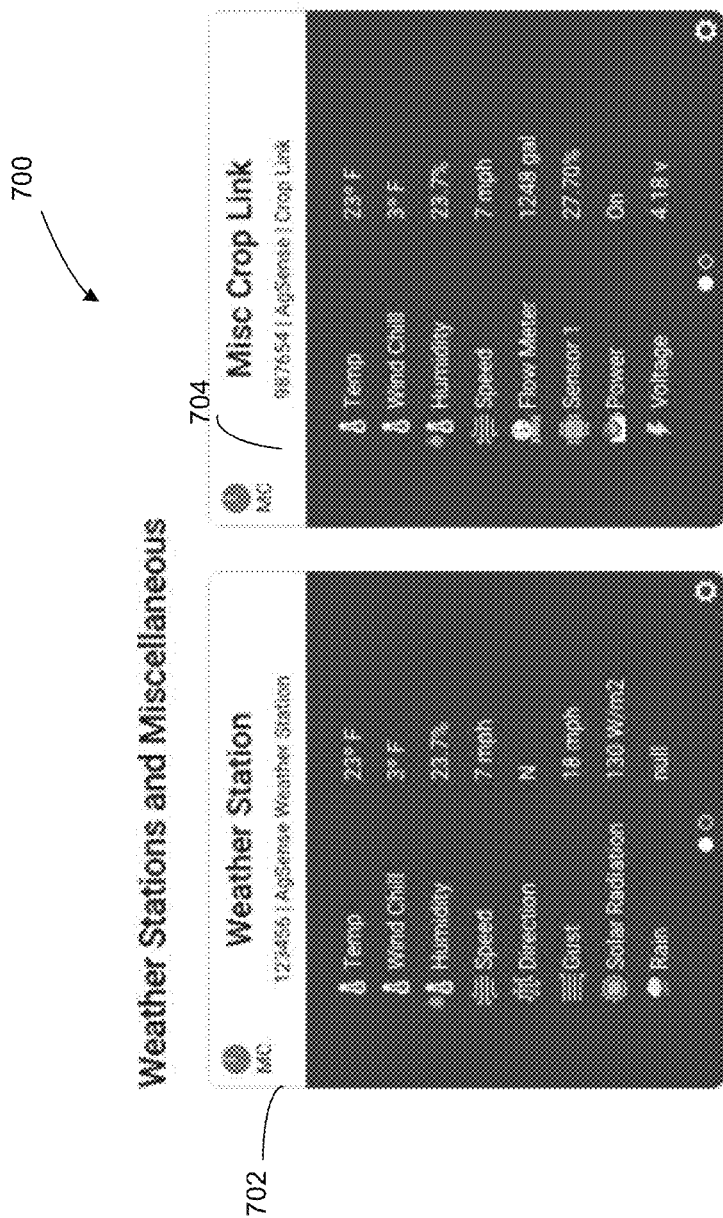
FIG. 7 shows an exemplary interactive display which consolidates a sixth and seventh set of field information in accordance with aspects of the present invention.

With reference now to FIG. 7, an interactive display 700 displaying a sixth and seventh set of field information is provided. As shown, the exemplary interactive displays 702, 704 may include weather data 702 such as: temperature, wind chill, humidity, wind speed, wind direction, solar radiation and rain levels. Additional displays 704 may include generic and single sensor data collected, formatted and displayed together including: weather data, flow meter data, moisture sensor data, system power data, voltage levels and the like.

Figure 8:
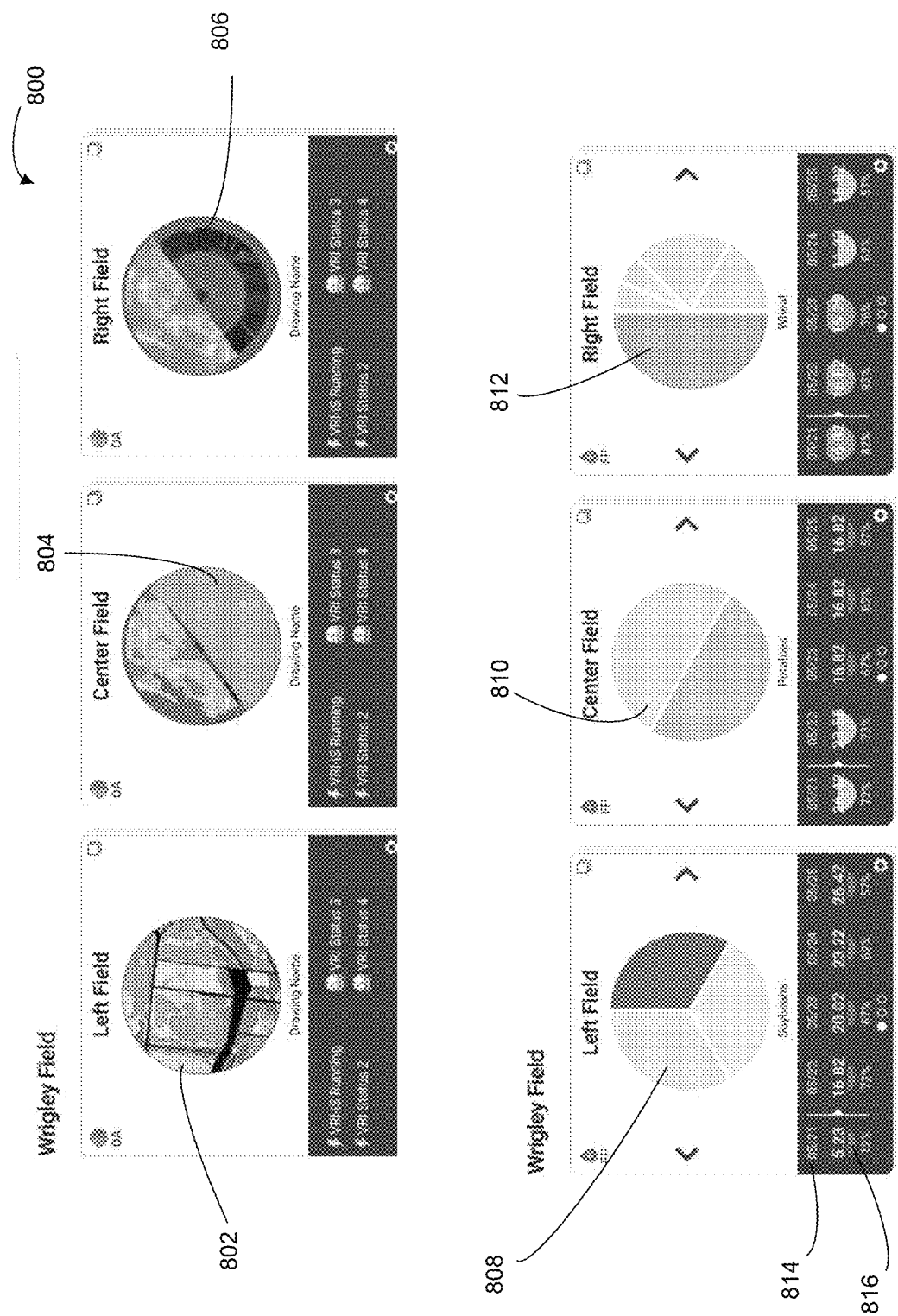
FIG. 8 shows an exemplary interactive display which consolidates an eighth set of field information in accordance with aspects of the present invention.

With reference now to FIG. 8, an alternative set of interactive displays 800 is shown. Specifically, the displays 802-812 may adjusted to provide a range of graphical displays of a given field. As shown in a first display 802, a user may select a graphical display of a field such as an overhead image of a given field area. Alternative, a hybrid display 804 may be used which includes an overhead display and a vector graphic display. As shown in a third hybrid display 806, the portions of the display incorporating overhead images and vector graphic images may be adjustably selected to provide combinations of multiple image types. Alternatively, or in combination with other images (both raster and vector), the graphical displays may incorporate chart graphics 808, 810, 812 (e.g. such as pie charts) which may represent collected data such as different soil moisture levels detected in different areas of a given field.

As further shown in displays 808-812, additional data may also include daily irrigation recommendations 814 (e.g. irrigation depth in inches) along with a representative shape 816 indicating the percentage of field capacity remaining. As shown, the daily irrigation recommendation may be superimposed over the representative shape 816 to provide an efficient view of the combined information. The field capacity may also be represented numerically. Preferably, the representative shape 816 may be based on a circle (or other shape) that changes from a full circle to a crescent depending on the soil moisture status. The shape(s) 816 may also be colored and may also change in color, shade and/or intensity to indicate different levels of soil moisture.

Figure 9:
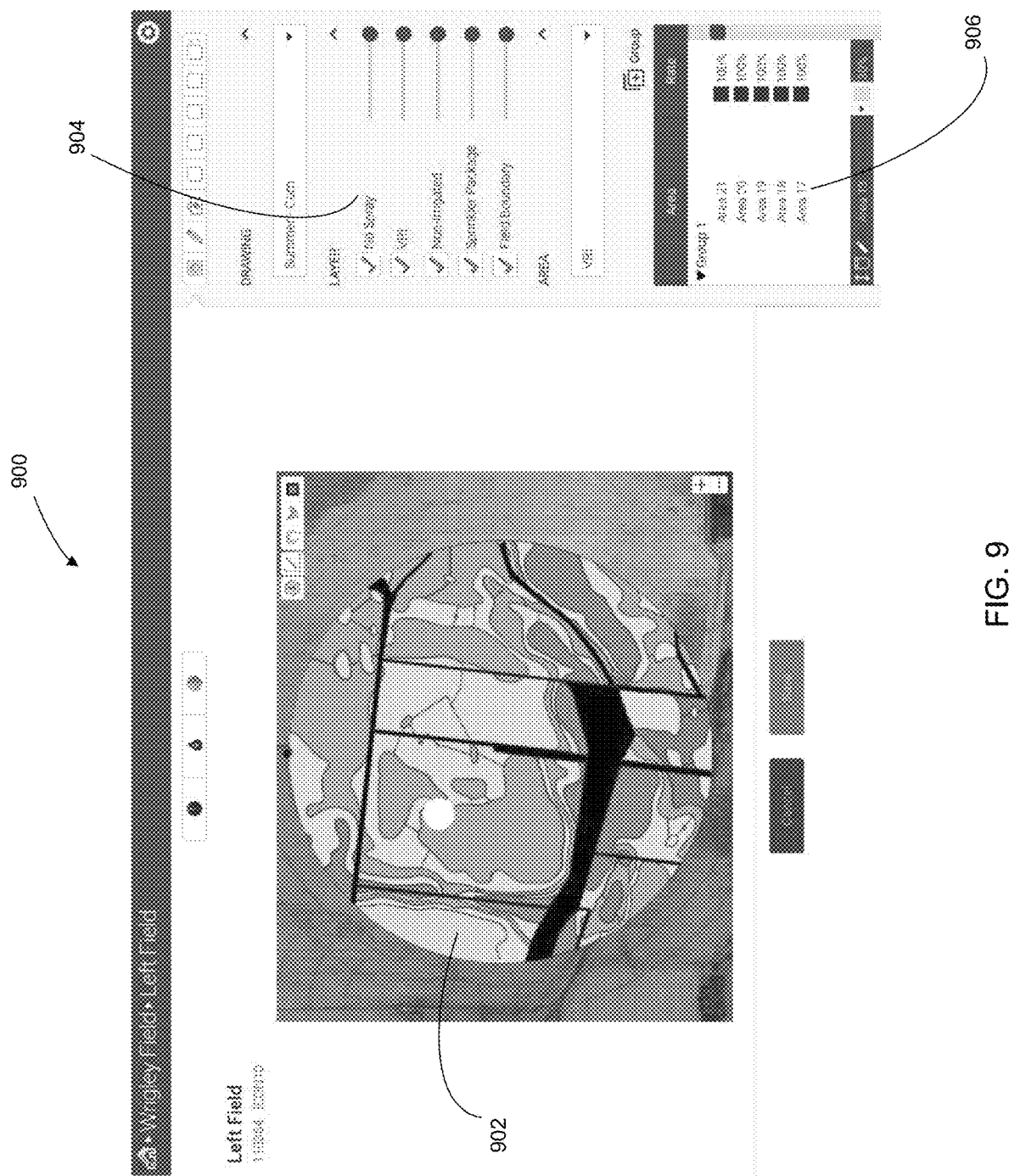
FIG. 9 shows an exemplary interactive display which consolidates a ninth set of field information in accordance with aspects of the present invention.

With reference now to FIG. 9, an exemplary interactive display 900 is provided which illustrates an overhead image 902 of an example field. As shown, the details of the image 902 are preferably adjustable so that different aspects of a given irrigation machine and its surrounding fields can be selected for viewing. For example, machine and field data may be displayed or hidden such as: spray area, over-spray area, potential drive areas, field boundaries, sprinkler packages, VRI paths and the like. Additionally, different areas of the field image 902 may be shaded to indicate moisture levels, remaining field capacity and the like. A legend 906 may also be provided.

Figure 10:
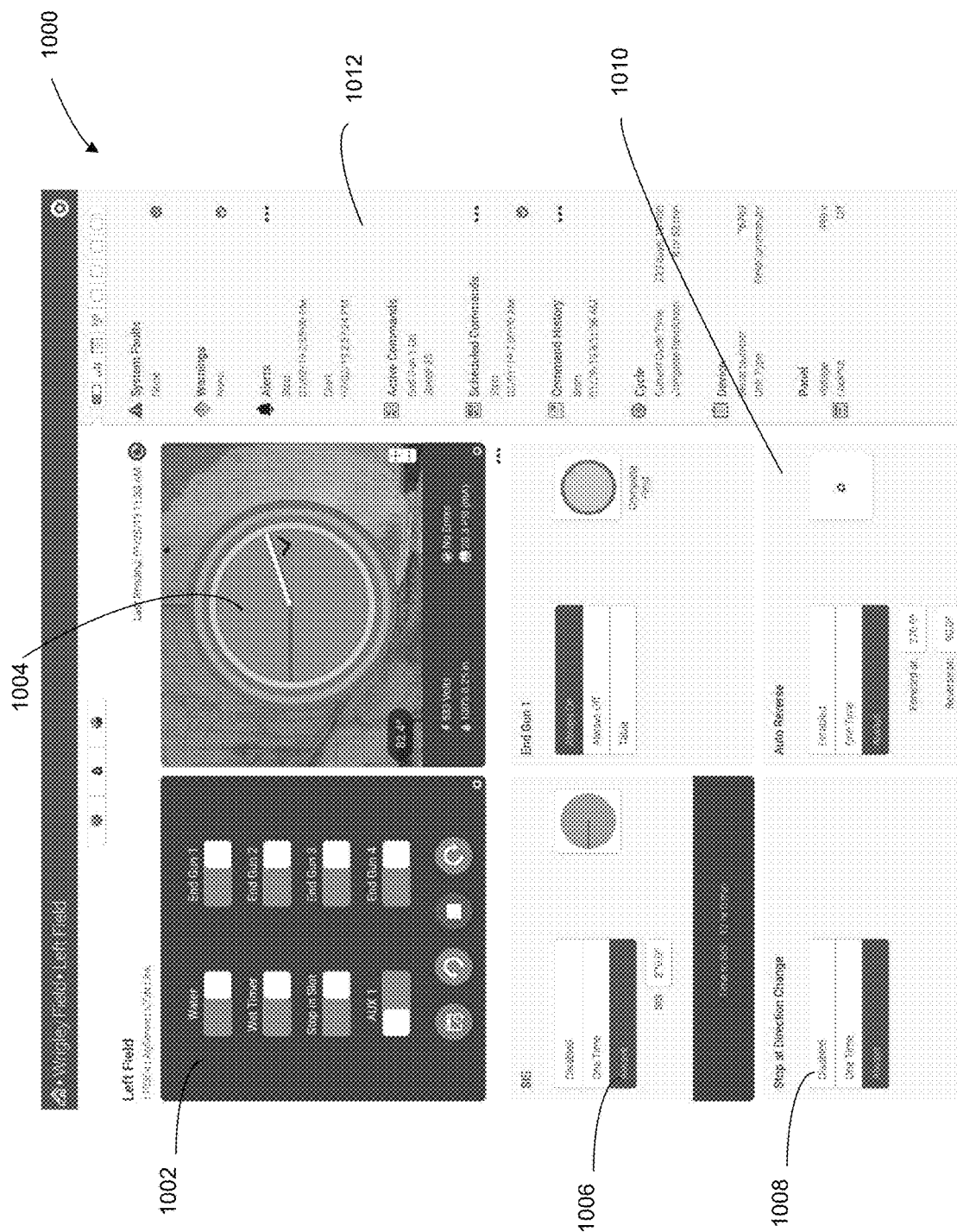
FIG. 10 shows an exemplary interactive display which consolidates a tenth set of field information in accordance with aspects of the present invention.
Figure 11:
FIG. 11 shows an exemplary interactive display which consolidates an eleventh set of field information in accordance with aspects of the present invention.

FIG. 10 provides another alternative display 1000 which includes selectable elements such as a graphical display 1004 of the center pivot as discussed above with reference to FIG. 2. Additionally, control GUIs 1002 may be provided to indicate the status of various irrigation machine systems/subsystems (e.g. endguns, water pumps, timers, etc.) and to allow an operator to select/deselect the operations of each subsystem. Other selectable operations may also be included such as: stop-in slot selections 1006 (indicating selectable stop angles), stop at change of direction selections 1008, auto reverse features 1010 and the like. Additionally, other selectable displays and linked data 1012 may include: system faults, warnings, alerts, active commands, scheduled commands, command history, current cycle status, device types, panel voltage and the like. Each of these elements may preferably be individually selectable for viewing and control. FIG. 11 provides an enlarged view 1100 of the overhead graphic display 1004 shown in FIG. 10.

Figure 12:
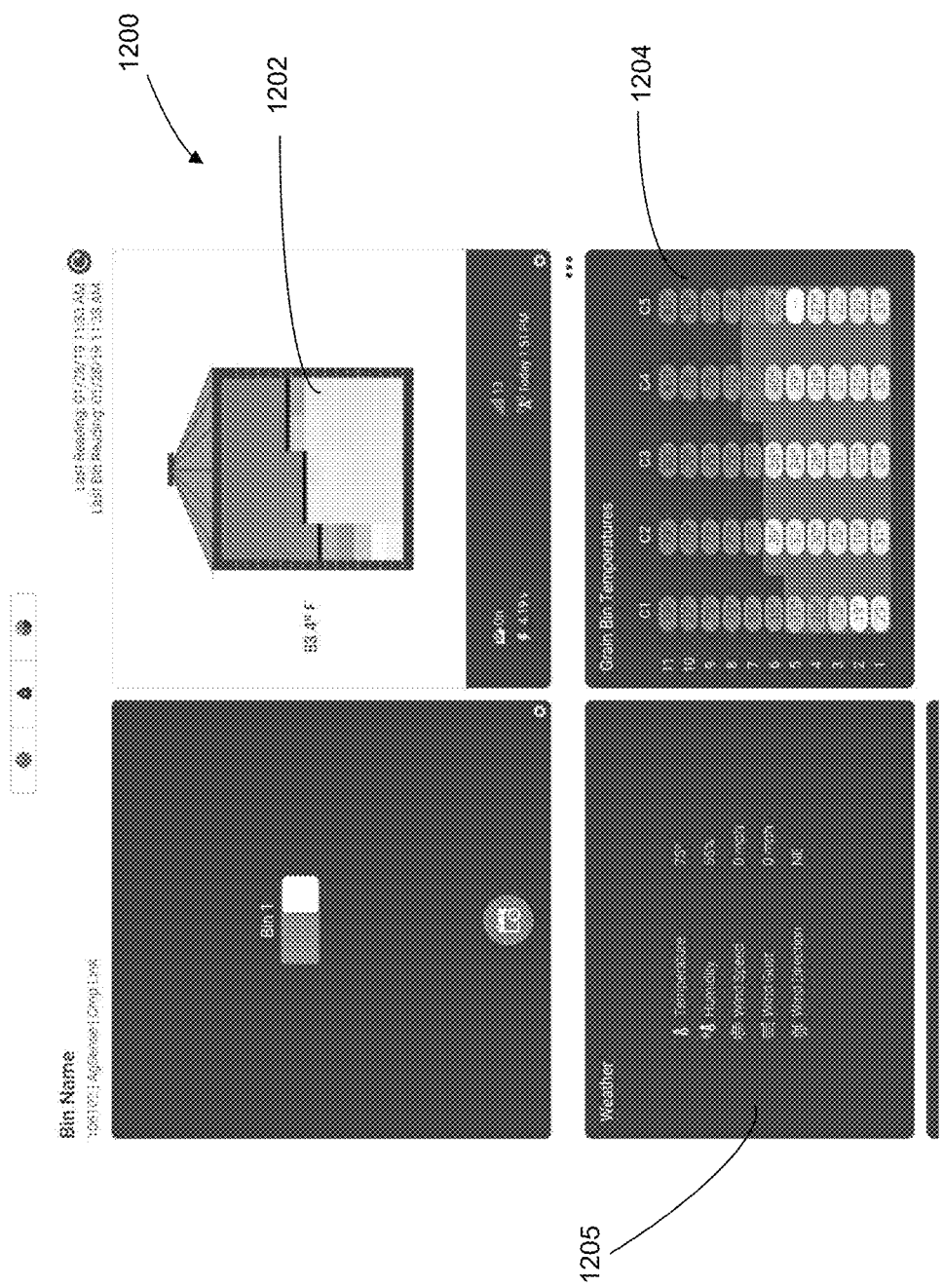
FIG. 12 shows an exemplary interactive display which consolidates a twelfth set of field information in accordance with aspects of the present invention.

With reference now to FIG. 12, an exemplary interactive display 1200 is shown which provides several different images and GUIs relating to grain bin monitoring. As shown, an example bin 1202 may be displayed with a graphic image illustrating the fill level of the grain bin 1202 and also displaying a temperature graphic/GUI. A display of weather data 1205 or the like may also be included.

Figure 13:
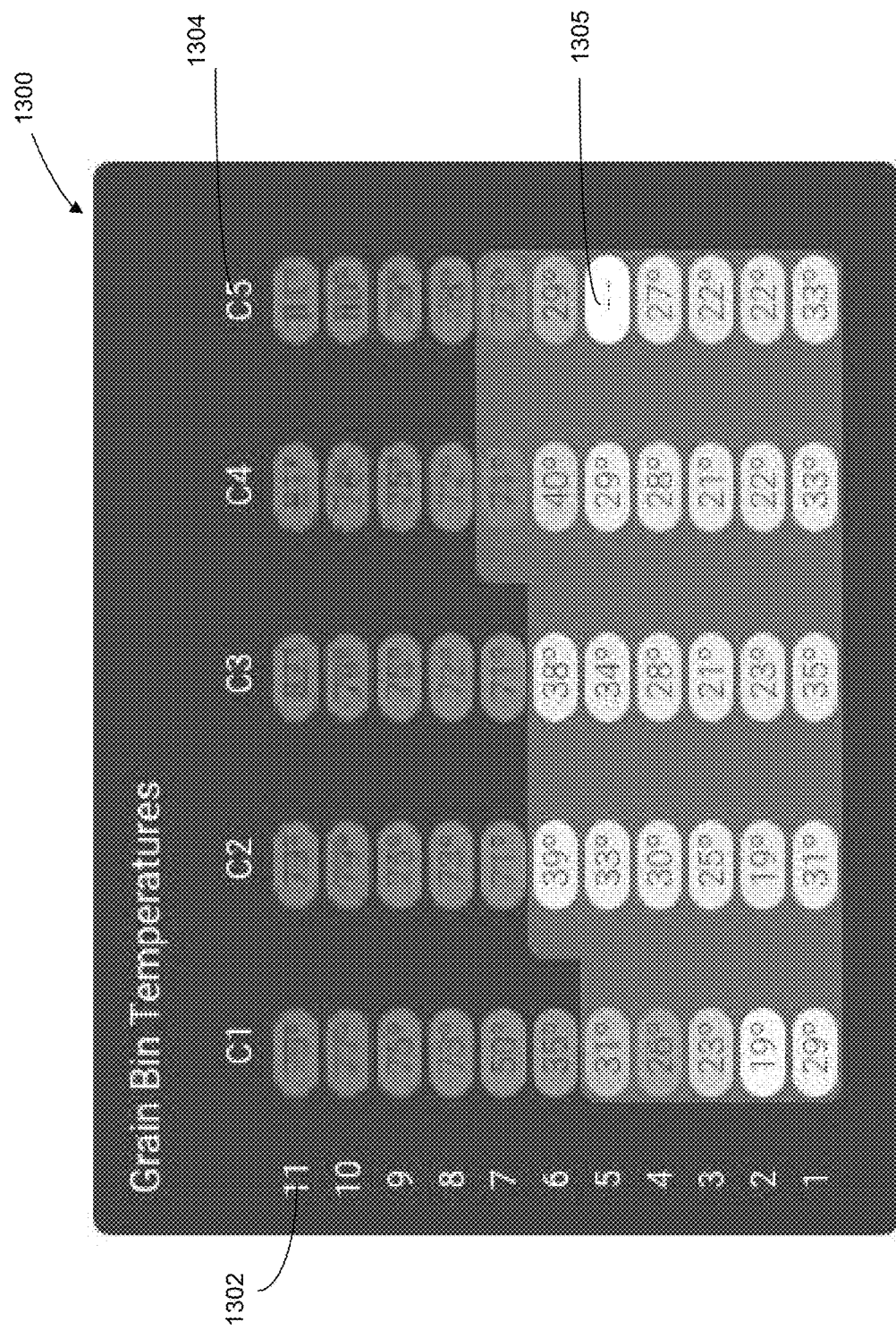
FIG. 13 shows an exemplary interactive display which consolidates a thirteenth set of field information in accordance with aspects of the present invention.

For grain bins, a further display 1204 may preferably be provided which includes a graphic display of temperature sensor readings to illustrate the temperature gradient within the grain bin. With reference to FIG. 13, an enlarged view 1300 of the temperature display 1204 shown in FIG. 12 is provided. Specifically, the enlarged view 1300 includes a vertical list 1302 of all temperature sensors within the grain bin (i.e. 11 at the highest level and 1 at the lowest) In the display 1300, temperatures for multiple vertical columns 1304 (column 1 to column 5) within a grain bin are shown. Preferably, the display 1300 may combine and display detected temperatures at set vertical levels within a given grain bin to provide a detailed view of the temperature gradient within a given bin. As further shown, unresponsive sensors 1305 may preferably also be graphically indicated.

Figure 14:
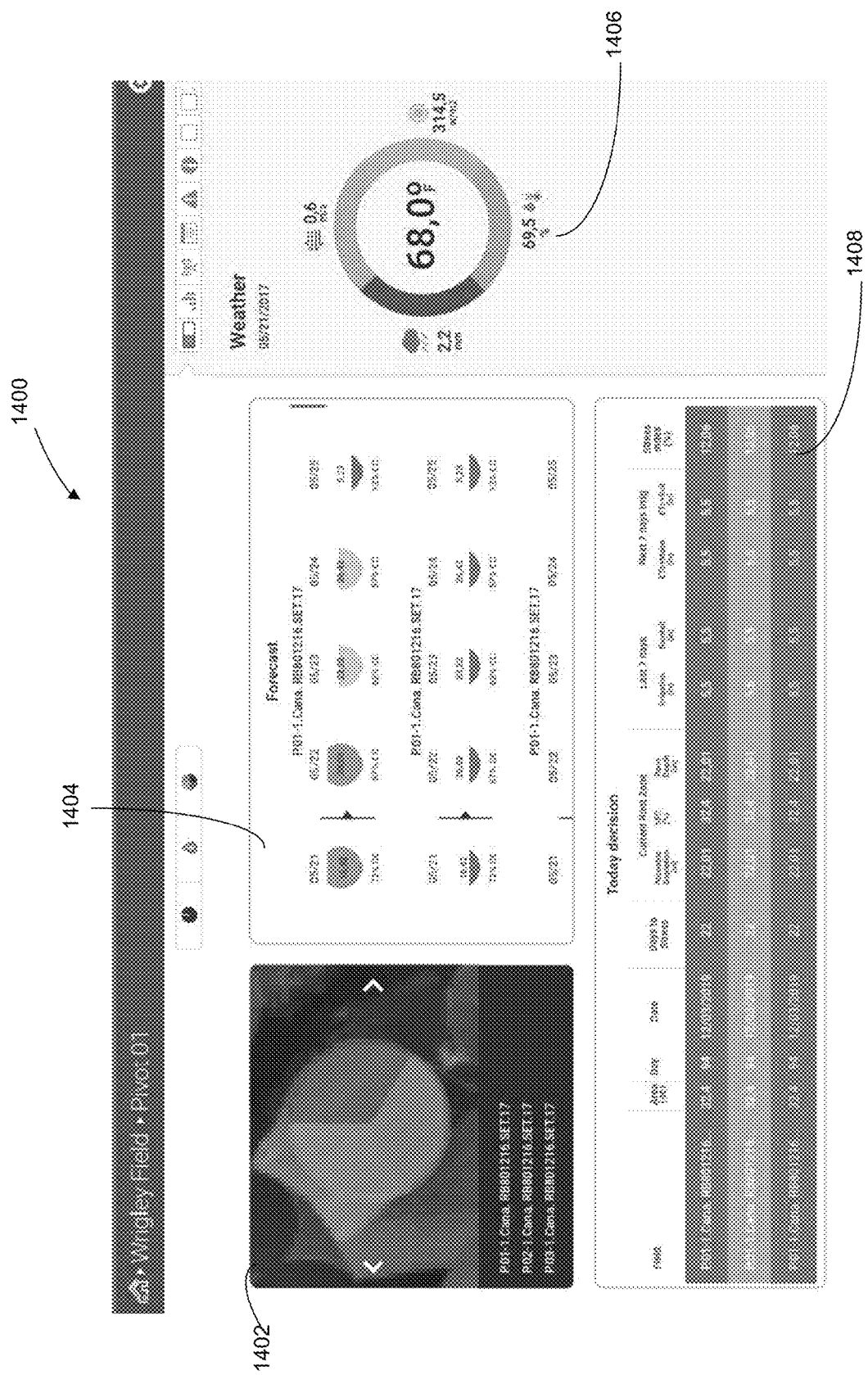
FIG. 14 shows an exemplary interactive display which consolidates a fourteenth set of field information in accordance with aspects of the present invention.

With reference now to FIG. 14, a further exemplary interactive display 1400 is provided showing a collection of graphics displaying field moisture data information for use in making a watering decision. As shown, a pie chart 1402 indicating the various moisture levels within a given field is provided. Additionally, a forecasting graphic 1404 is provided including a daily irrigation recommendation (e.g. irrigation depth in inches) along with representative shapes indicating the percentage of field capacity remaining as discussed above. A graphic 1406 indicating weather conditions is also provided. According to a preferred embodiment, a given operator may preferably select and arrange each selection of graphics to assist the operator in making watering decisions. With the data displayed, the system of the present invention preferably may also display a set of GUIs to allow the operator to select and modify an irrigation plan accordingly.

According to preferred embodiments, the system of the present invention may preferably receive data from a variety of sources including allowing a user to input data. Preferably, the displays of the present invention may preferably automatically update and display updated irrigation forecast data a selected number of days ahead. Additionally, the system of the present invention may preferably continually update images, sensor data and other status indications from each monitored system and automatically update related displays. The system may preferably further provide alerts to the operator when new data is updated or when detected data is outside pre-selected thresholds.

The scope of the present invention should be determined not by the embodiments illustrated, but by the appended claims and their legal equivalents.

What is claimed is:

1. A system for monitoring and controlling an irrigation system, the system comprising:

a first irrigation machine, wherein the first irrigation machine comprises a first plurality of irrigation spans supported by at least a first drive tower; wherein the first irrigation machine comprises a first irrigation drive control system, a first drive control interface; a first control communication system, and a plurality of first irrigation sensors;

a second irrigation machine, wherein the second irrigation machine comprises a second plurality of irrigation spans supported by at least a second drive tower; wherein the second irrigation machine comprises a second irrigation drive control system, a second drive control interface; a second control communication system, and a plurality of second irrigation sensors;

a first water distribution system; wherein the first water distribution system comprises a first set of conduits attached to a first set of nozzles; wherein the first water distribution system is configured to transmit a first set of water distribution data;

a first water pumping system; wherein the first water pumping system comprises: a first water pump, a first water pump control interface; a first pump communication system; wherein the first pump communication system is configured to transmit a first set of pump data and to receive a first set of remotely transmitted first water pump control instructions;

a soil moisture sensing system; wherein the soil moisture sensing system comprises a plurality of soil moisture sensors and a soil moisture sensor communication system; wherein the soil moisture sensing system is configured to transmit a first set of soil moisture data;

a water level sensing system; wherein the water level sensing system comprises a plurality of water level sensors and a water level sensor communication system; wherein the water level sensing system is configured to transmit a first set of water level data; and an irrigation control system, wherein the irrigation control system comprises: an irrigation controller, a data collection module; a system control module; and a system display module; wherein the irrigation controller is configured to cause the system display module to display a first plurality of graphical user interfaces representing a first set of system data, and a second plurality of graphical user interfaces which comprise selectable control instructions;

wherein the irrigation controller is configured to cause the system display module to display a first plurality of graphical user interfaces representing a first set of system data for the first irrigation machine, and a second plurality of graphical user interfaces which comprise selectable control instructions for the first irrigation machine;

wherein the irrigation controller is configured to cause the system display module to display a third plurality of graphical user interfaces representing a first set of system data for the second irrigation machine, and a fourth plurality of graphical user interfaces which comprise selectable control instructions for the second irrigation machine.

2. The system of claim 1, wherein the irrigation controller is configured to control linear irrigation machines, center-pivot machines and corner type machines.

3. The system of claim 2, wherein the first irrigation machine and the second irrigation machine are different machine types.

4. The system of claim 3, wherein the irrigation controller is configured to display data and graphical user interfaces to control irrigation machines operating in different areas of a given field.

5. The system of claim 4, wherein the irrigation controller is configured to display data and graphical user interfaces to control irrigation machines operating in different fields.

6. The system of claim 5, wherein the irrigation controller is configured to display data and graphical user interfaces to control irrigation machines operating in different fields with different field setups.

7. The system of claim 6, wherein the fields setups comprise a set of irrigation system settings selected from the group of settings comprising: sprinkler package, VRI path, end gun settings, stop settings, and timer settings.

8. The system of claim 7, wherein the selectable control instructions for the first irrigation machine comprise selectable stop angles.

9. The system of claim 8, wherein the selectable control instructions comprise selectable stop conditions.

10. The system of claim 9, wherein the selectable stop conditions comprise: pre-selected stop angles, changes of direction, and field features.

11. The system of claim 10, wherein the detected field features comprise: sprayed areas, over-sprayed areas, drive areas, non-drive areas, field boundaries, field obstacles and field conditions.

12. The system of claim 11, wherein the first irrigation sensors comprise a first water pressure sensor and a first flow sensor.

13. The system of claim 12, wherein the second irrigation sensors comprise a second water pressure sensor and a second flow sensor.

14. The system of claim 13, wherein the data collection module is configured to receive system data comprising drive control system data; soil moisture data, water distribution data, weather data, water level data; and storage bin data.

15. The system of claim 14, wherein the system control module is configured to transmit system control instructions to a plurality of system components.

16. The system of claim 15, wherein the system components comprise components selected from the group of components comprising: the first irrigation machine, the second irrigation machine, the first water distribution system and the first water pumping system.

17. The system of claim 16, wherein the system comprises a weather sensing system; wherein the weather sensing system comprises a plurality of weather sensors and a weather sensor communication system; wherein the weather sensing system is configured to transmit a first set of weather data.

* * * * *